United States Patent [19]
Johnson et al.

[11] Patent Number: 5,443,719
[45] Date of Patent: Aug. 22, 1995

[54] SYSTEM AND REACTOR FOR MIXING COAGULATING AGENTS INTO A CONTAMINATED WATER FLOW, AND FOR REMOVING CONTAMINANTS THEREFROM

[75] Inventors: Dennis E. J. Johnson, Englewood; Clifford F. Frith, Boulder, Colo.

[73] Assignee: Aqua-Ion Systems, Inc., Littleton, Colo.

[21] Appl. No.: 200,749

[22] Filed: Feb. 23, 1994

[51] Int. Cl.$^6$ ............................................. C02F 1/48
[52] U.S. Cl. ..................................... 210/101; 210/143; 210/199; 210/205; 210/223
[58] Field of Search ............... 210/695, 143, 205, 206, 210/207, 222, 223, 101, 199

[56] References Cited

U.S. PATENT DOCUMENTS

| | | | |
|---|---|---|---|
| 3,186,929 | 6/1965 | Rippie | 204/155 |
| 4,382,866 | 5/1983 | Johnson | 210/748 |
| 4,562,014 | 12/1985 | Johnson | 261/76 |
| 4,655,933 | 4/1987 | Johnson et al. | 210/721 |

*Primary Examiner*—Peter A. Hruskoci
*Attorney, Agent, or Firm*—Michael de Angeli

[57] ABSTRACT

An improved system and a novel vessel and method for treating contaminated liquids, e.g., aqueous effluent streams, contaminated with a variety of contaminants. The vessel comprises upper and lower mixing chambers connected by an intermediate tubular section and a fluid exit tube running coaxially down the center of the intermediate tubular portion. The contaminated fluid stream to be treated flows in a spiral pattern generally upwardly entering the exit tube at its upper end and flowing downwardly to a lower exit. A magnetic field may be induced in the flow stream. Streams of the fluid to be treated and of an ionized coagulant are combined prior to entry into the vessel and are subjected to very turbulent flow and to the magnetic field, to encourage both very thorough mixing and magnetic coalescing of the coagulant with the fluid to be treated. Magnetite particles may additionally be added to the flow stream to further encourage coagulation in the presence of a magnetic field. After exiting the mixing chamber, the coagulated contaminants may be removed using a variety of known and novel adsorption, absorption, and filtration steps.

23 Claims, 3 Drawing Sheets

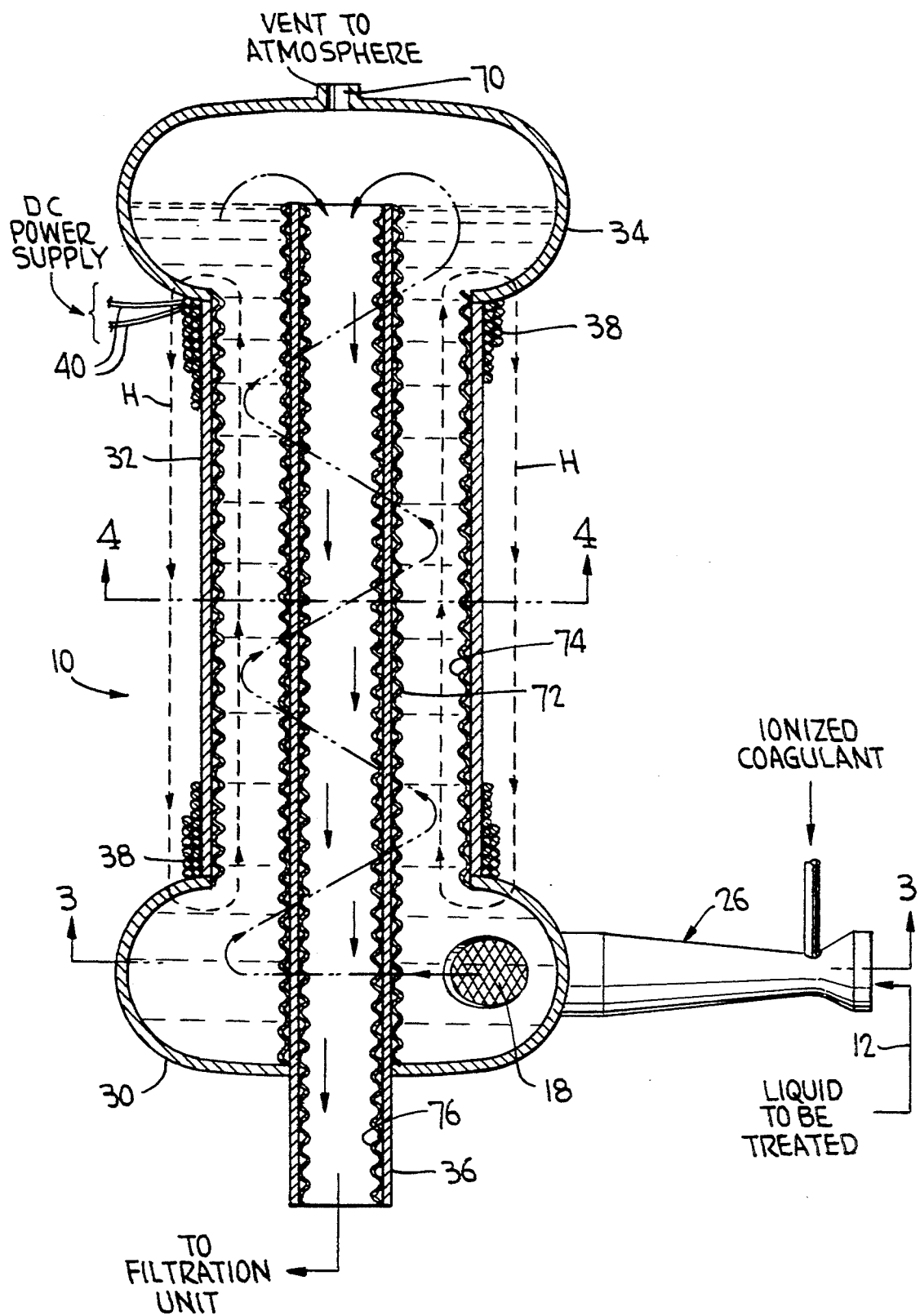

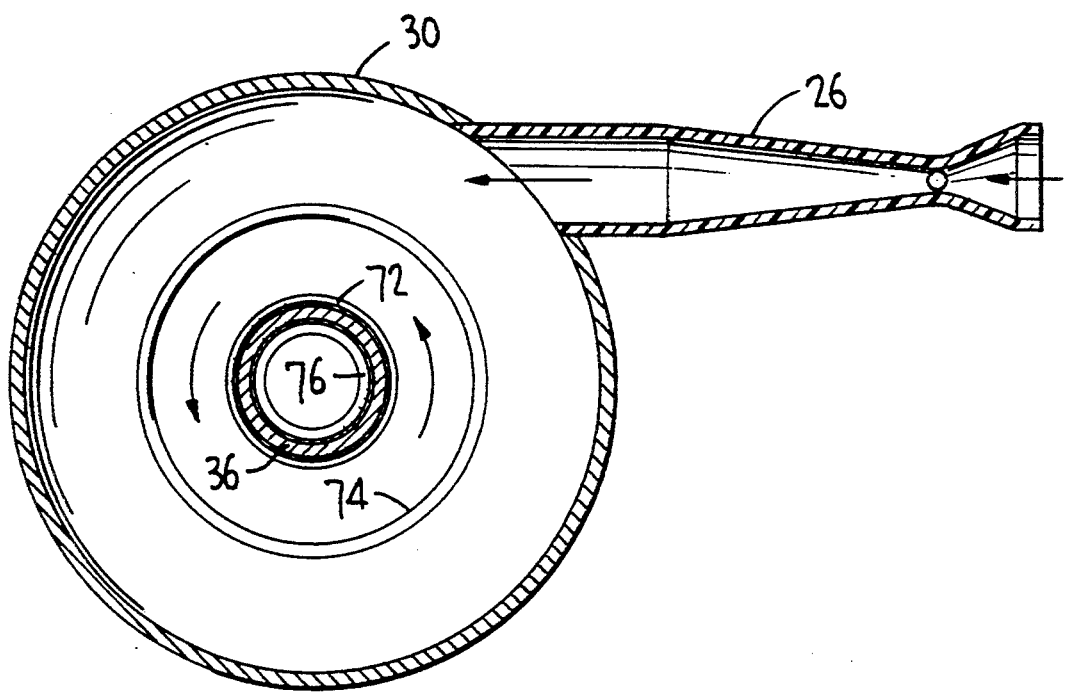
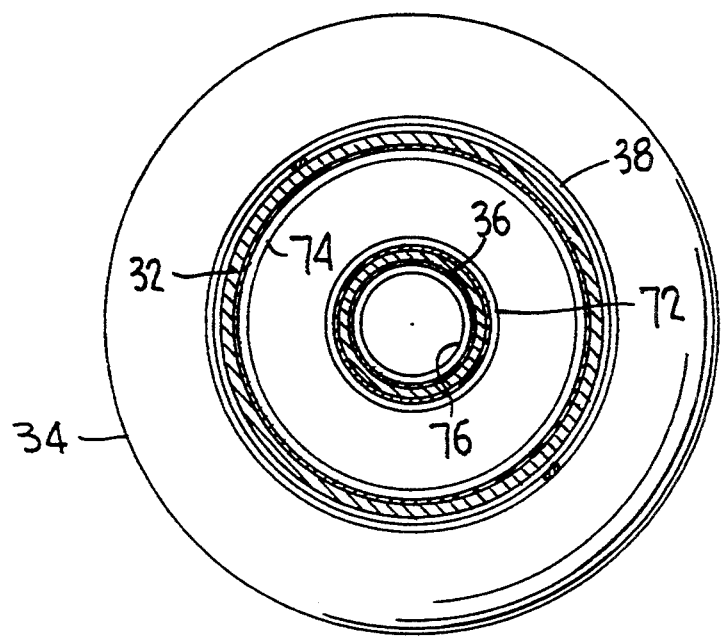

SYSTEM AND REACTOR FOR MIXING COAGULATING AGENTS INTO A CONTAMINATED WATER FLOW, AND FOR REMOVING CONTAMINANTS THEREFROM

FIELD OF THE INVENTION

This invention relates generally to the field of water purification. More particularly, this invention relates to an improved apparatus, method, and system for thoroughly mixing coagulating agents with contaminated water streams, and initiating efficient coagulation, in order to improve the efficiency of coagulating unwanted contaminants as a step in their removal from the water stream.

BACKGROUND OF THE INVENTION

There are countless applications in which it is important to remove contaminants from various commercial, industrial, and municipal water streams prior to further treatment or as a final treatment prior to discharge into sewers, waterways, and the like. Examples of materials which must be removed from such water streams include oil and grease emulsions, heavy metals, contaminants exhibiting biological oxygen demand (BOD), organic solubles and particulates, contaminants ,exhibiting chemical oxygen demand (COD) such as colloidal solid particulate wastes, and other contaminants, including contaminants expressed as total organic carbon (TOC) and total inorganic carbon (TIC). For example, the effluent from a typical industrial source discharged into the environment often contains oil and grease emulsions, heavy metals, and colloidal and suspended solid particulates. Other process streams may include various multiple combinations of these and additional organic and inorganic contaminants, in a relatively large volume of discharge water. As these contaminants are normally suspended, dissolved, or dissociated in the water stream—that is, as distinguished from being comparatively large particles—they are difficult to remove employing typical physical filtration steps.

The prior art teaches many process steps and techniques, many devices, and numerous combinations thereof for causing such particulates and other contaminants in a water stream to coagulate (including in this term "coalesce", "flocculate", "agglomerate", and other terms of like import) so that they can be removed by physical separation processes, typically including filtration. For example, it is known to add flocculants, coagulants, and the like to a process stream, again, to draw such contaminants out of solution and to agglomerate particles for filtration.

It is also known to mix oxidant gases and the like, including, for example, ionized oxygen or allotropes thereof into waste water streams, specifically for coagulation of contaminants and the like for subsequent filtration. See U.S. Pat. No. 4,655,933 to one of the inventors hereof and another. U.S. Pat. No. 4,562,014 to one of the inventors hereof discloses a system for so doing involving a venturi for dispersing a gas into a liquid to be treated, encouraging mixing of the gas and the liquid due to the drop in pressure at the venturi.

It is also known to perform a variety of filtration steps downstream of a system for flocculating or coagulating pollutants in a contaminated water stream by passing the stream through an electrochemical filtration device. See U.S. Pat. No. 4,382,866 to one of the inventors hereof.

The art also is aware that many undesired materials to be removed from a water stream are typically polarized, and are electrically responsive, such that a magnetic field in the water stream can be of use in causing such particles to agglomerate, coagulate, and/or coalesce for subsequent removal. However, the art has not provided a simple and efficient way of applying a magnetic field to such a stream of water to be treated.

Further, the art is aware that any coagulant to be mixed with a water stream to be purified must necessarily be thoroughly mixed with the water stream, so as to obtain maximum efficiency in its use. This is true whether the coagulant is an ionized gas, such as oxygen, nitrogen, a halogen, or ozone, or an anionic or cationic polymer liquid as often used for coagulant or flocculant purposes. However, the art does not teach fully satisfactory apparatus for complete mixing of coagulants, typically comprising ionized gases or liquids, with a stream of water to be treated thereby.

OBJECTS OF THE INVENTION

It is therefore an object of the invention to provide a system, apparatus, and method for the very efficient mixing of a stream of an ionized gas or liquid coagulant with a stream of a contaminated liquid to be treated, and specifically for doing so in the presence of a magnetic field, extending substantially uniformly through the streams to be mixed, such that the ionizing gas or liquid is thoroughly mixed with the liquid to be treated under circumstances encouraging formation of coagulant and flocculant masses for subsequent removal, by, for example, adsorption, absorption, or filtration.

It is a further object of the invention to provide a simple apparatus for thus mixing an ionized gas or liquid with a stream of contaminated liquid to be treated and having the additional capability of adding reactive magnetite coagulant nucleating particles to the process stream where necessary, also in a simple and efficient manner.

It is a further object of the invention to provide a specific device for treating liquid flow streams containing various types of undesired contaminants, wherein an ionized gas or liquid coagulant is efficiently mixed with the stream to be treated in the presence of a magnetic field to ensure very efficient mixing and coagulation, for subsequent removal of the contaminants.

SUMMARY OF THE INVENTION

The above objects of the invention and others which will appear as the discussion below proceeds, and the listed needs of the art, are met by the method, system, and apparatus of the invention for thoroughly intermixing an ionized coagulant with a stream of water containing contaminants to be treated thereby. The apparatus of the invention comprises a novel mixing vessel including upper and lower mixing chambers connected by an intermediate elongated tubular portion. A stream of fluid to be treated—typically contaminated water—is initially combined with a stream of one or more ionized coagulants, in an inlet tube disposed such that the combined stream enters the lower mixing vessel horizontally, but off axis, so as to define a tangential flow path extending around the lower vessel. A fluid exit tube extends vertically through the centers of the lower mixing chamber, the intermediate tubular portion, and the upper mixing chamber. Accordingly, a cocurrent flow of streams of contaminated fluid and coagulant entering the lower mixing chamber off axis, as mentioned, tends to move in a highly turbulent, generally spiral flow pattern upwardly through the lower mixing chamber and then through the intermediate tubular portion, finally reaching the upper mixing chamber, and pouring into the open upper end of the exit tube to be reversed in flow and drained vertically downwardly.

A coil of wire is wrapped around at least the intermediate tubular portion of the vessel, for applying a magnetic field to fluid flowing therein. Preferably, the coil is energized by a direct current (dc) potential, the polarity of which is changed at controllable intervals on the order of several seconds to several minutes, to avoid build-up of coagulated contaminant particles within the vessel.

The ionized coagulant and the contaminated water to be treated are preferably combined at a reduced-diameter throat of a venturi tube, so that the ionized coagulant is injected into the incoming water stream at its point of highest pressure; because the stream is therefore immediately depressurized as it enters the vessel, the ionized coagulant tends to disperse in the water stream.

The mixing vessel thus provides very turbulent mixing conditions, ensuring that the ionized coagulant is physically mixed thoroughly with the fluid to be treated, while the magnetic field further encourages the ionized coagulant to bind the contaminants to be removed, substantially all of which are also ionized and/or are magnetically polar to some extent.

In a preferred embodiment, the surfaces of the fluid exit tube exposed to the water stream and at least the inner surface of the intermediate elongated tubular portion of the vessel may be provided with a corrugated metallic surface defining a number of radially inwardly extending ridges, tending to cause further turbulence and enhanced physical mixing, as well as concentrating the magnetic field inward and thus increasing the magnetic enhancement of the coagulation process.

In a further embodiment of the system of the invention, magnetite coagulant particles, comprising particles of iron oxide, may be added to the process stream prior to combination with the ionized coagulant, to provide further nucleation and agglomeration sites promoting coagulation of the contaminants to be removed from the process stream to be treated.

After exit from the vessel, the mixed stream of fluid to be treated and the ionized coagulant may be admitted to any of several types of filter for removing the coagulated contaminants therefrom. These may comprise an anode/cathode accelerator for further coagulating the contaminants to be removed by means of a further magnetic field, and one or more conventional filters comprising sand, charcoal, or the like, or other known filter media. The contaminated water stream may additionally be admitted to a secondary reactor having a configuration similar to the first vessel for further coagulation of particularly difficult contaminants. The filters may be backflushed at intervals, and the filtrate removed for recovery or appropriate disposal.

BRIEF DESCRIPTION OF THE DRAWINGS

The invention will be better understood if reference is made to the accompanying drawings, in which:

FIG. 2 shows a cross-sectional view through the vertically elongated mixing vessel according to the invention, and the preferred venturi tube used at its inlet; and FIGS. 3 and 4 show cross-sections along the lines 3—3 and 4—4 of FIG. 2.

DESCRIPTION OF THE PREFERRED EMBODIMENTS

Figure 1:
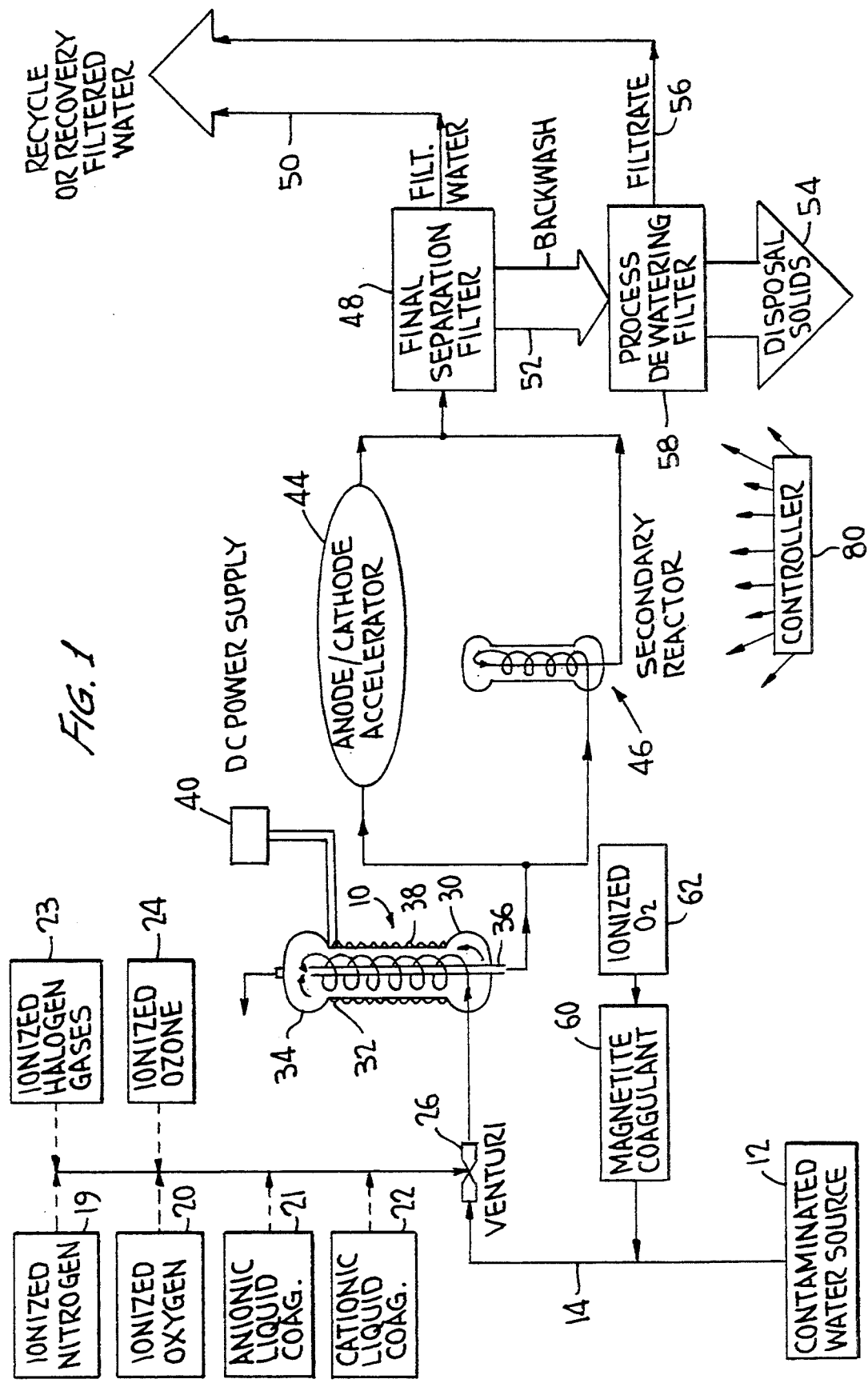
FIG. 1 shows an overall view of the system according to the invention.

As discussed above, the invention comprises a novel vessel for thoroughly and completely mixing an ionized coagulant with a stream of water or other liquid to be treated, and a method and system for its use in removing contaminants from a stream of water or other fluid to be treated. FIG. 1 shows an example of the system of the invention. A mixing vessel 10 receives a stream of contaminated water or other fluid from a source 12 connected to vessel 10 by an inlet conduit 14. The stream of water from the source 12 is combined with one or more of a selection of ionized coagulants provided along a second conduit 16, such that a preliminary combination step takes place prior to entry of the streams into the vessel 10. As indicated specifically, the ionized coagulant supplied may be ionized nitrogen supplied from a source 19, ionized oxygen from a source 20, an anionic liquid coagulant such as a polymer from a source 21, a cationic liquid coagulant from a source 21, an ionized halogen gas from a source 23, ionized ozone from a source 24, further coagulant materials or gases, or mixtures of these.

Preferably, the streams of ionized coagulant and contaminated water or other fluid to be treated from source 12 are initially combined in a venturi 26. The venturi 26 receives the stream of water to be treated at a relatively large opening. The stream is then constrained to pass through a relatively small flow passage, increasing its velocity and pressure. The ionized coagulant is injected at substantially the smallest cross-section of the venturi, so that when the combined streams then pass into a passage of expanding cross-section, the coagulant tends to be dispersed in the reduced-pressure stream. Further details of the venturi are discussed below in connection with FIG. 2.

The "cocurrent" combined streams of water or other fluid to be treated from source 12 and the ionized coagulant, having thus been preliminarily combined, are supplied to the vessel 10, details of which are discussed below in connection with FIGS. 2-4. As shown schematically in FIG. 1, the combined stream is admitted towards the bottom of a vertically-extending vessel 10 having a lower mixing chamber 30, an intermediate elongated tubular portion 32, and an upper mixing chamber 34. A fluid exit tube 36 extending coaxially through the vessel 10 has an open inlet end in the approximate center of the upper mixing chamber 34 and a lower exit end. Thus, the preliminarily combined cocurrent streams of the fluid to be treated and the coagulant enter the lower mixing chamber and travel in a generally spiral path upwardly through the intermediate tubular portion 32, around the fluid exit tube 36, and enter the upper end of the fluid exit tube 36 in the center of the upper mixing chamber 34. This fluid path provides very substantial turbulence and excellent mixing of the ionized coagulant with the water to be treated.

A coil of insulated wire 38 is provided around at least the intermediate tubular portion 32 of the vessel 10 and is connected to a dc power supply 40. When power supply 40 is energized, a magnetic field is emitted by coil 38, extending generally axially along the direction of elongation of the intermediate tubular portion of the vessel 10, and into the upper and lower mixing vessels 30 and 32. This magnetic field tends to encourage intimate contact between the ionized coagulants and the contaminants of the fluid to be treated, aiding in coagulation and flocculation of the contaminants to be removed.

After exiting the vessel 10, the stream is directed to one or more of a variety of possible devices for separating the coagulated and flocculated contaminants from the water stream. As indicated in FIG. 1, these may comprise an anode/cathode accelerator 44, that is, a device defining an electric field extending parallel to the direction of flow of the stream for further coagulating and separating ionized and polar materials therein. A secondary reactor generally similar to vessel 10 may also be provided as indicated at 46. The separation of the coagulated contaminants from the water stream is performed in a final separation filter 48 which may comprise any of a variety of known media such as sand filters, activated charcoal filters, mechanical filtration media, and combinations of these and other known filters. The filtered water may be passed at 50 to further purification devices such as ion exchange media, or the like, or may be directly reused. From time to time, filter 48 is backwashed as indicated at 52, and the collected contaminants removed and disposed of at 54. Further water may be recovered in this process as indicated at 56 by a dewatering step 58.

In connection with removal of certain contaminants, it may be desirable to add magnetite particles to the contaminated water stream. Magnetite particles are essentially iron oxide and are highly magnetic, thus tending to form nucleation sites for flocculation or coagulation of the contaminants to be removed from the water stream when exposed to the magnetic field from coil 32. Suitable magnetite particles can be provided by a source 60, comprising, for example, a device wherein a further water stream flows between coaxial closely-spaced electrically-insulated steel pipes. For example, if a dc positive potential is applied to one of the pipes and a negative potential to the other, and if ionized oxygen or ozone is added as indicated at 62, particles of iron oxide will tend to form on the facing surfaces of the coaxial steel pipes and enter the water stream. See generally U.S. Pat. No. 3,186,929 to Rippie. As indicated, such iron oxide magnetic particles are very effective in nucleating the flocculation or coagulation of the contaminants to be removed from the water stream.

FIG. 2 shows further details of the vessel 10 taken through its vertical axis, with FIGS. 3 and 4 showing sections along the line 3—3 and 4—4, respectively. The major components of the vessel 10 are, as mentioned above, the lower mixing vessel 30, an intermediate tubular portion 32, and an upper mixing vessel 34. These may be formed integrally of welded steel components. In a successfully tested embodiment, the upper and lower mixing vessels 30 and 34 are 8 inches in diameter, that is, horizontally in FIG. 2, and are 6 inches deep vertically, while the tubular intermediate section 32 is 6 inches in diameter and 24 inches long.

Within the vessel 10 extends a fluid exit tube 36 substantially coaxial with the intermediate tubular portion 32 and with vessels 30 and 34. As shown, the fluid exit tube 36 extends vertically downwardly from an upper inlet substantially in the center of the upper mixing vessel 34 to an exit opening beneath the bottom of the lower mixing vessel 30. The fluid exit tube is approximately two inches in diameter and may also be formed of steel so as to be welded to the lower mixing vessel 30 at its exit to conveniently provide support.

The liquid to be treated from source 12 and the ionized coagulant, including an ionized gas or liquid from any one of sources 19–24, or mixtures thereof, or other coagulant or flocculant materials, are combined in venturi 26, as discussed above. In a successfully tested embodiment, venturi 26 is approximately 11 inches long overall, has 1.5 inch diameter inlet and outlet openings, and tapers to a diameter of $\frac{3}{8}$ inch at its throat. The ionized coagulant is injected substantially at the throat of venturi 26, as shown, that is, at the maximum pressure point of the fluid stream, such that when the pressure in the mixture decreases towards the exit orifice of venturi 26, the coagulant tends immediately to be dispersed throughout the stream of liquid to be treated.

As indicated, the inlet into lower mixing vessel 30 from venturi 26 is generally horizontal, but is off-axis (see FIG. 3) such that the flow of the mixed liquid to be treated in coagulant tends to be circular, around fluid exit tube 36. Accordingly, the combined streams flow upwardly through intermediate tubular section 32 along a generally spiral flow path extending around fluid exit tube 36, thus ensuring thorough further mixing of the ionized coagulant with the fluid to be treated. A flow-dividing baffle 18, formed of expanded metal mesh, for example, may be provided at the inlet for promoting further turbulence.

It will be appreciated throughout this discussion that if a stream of magnetite particles is added, this also is thoroughly mixed with the ionized coagulant and the fluid to be treated throughout the passage thereof through mixing vessel 10.

The mixture of the ionized coagulant, the fluid to be treated (and as noted, magnetite particles, if employed) exits vessel 10 by way of fluid exit tube 36. More particularly, the mixture enters fluid exit tube through its upper end as shown by the arrows in FIG. 2. At this point, there is no pressure in the system, as indicated by vent 70. This stream thus flows downwardly through the fluid exit tube and on to further filtration steps, as discussed above in connection with FIG. 1.

In a further preferred embodiment, a number of radially inwardly extending ridges, preferably of a ferromagnetic material, such as a suitable stainless steel, may be provided on the facing surfaces of the annular passageway between the fluid exit tube 36 and intermediate tubular portion 32 of the vessel, and on the inner surface of fluid exit tube 36, by disposition of corrugated sleeves 72, 74, and 76 therein. Alternatively, such ridges might be formed in the surfaces of fluid exit tube 36 and intermediate tubular portion 32. These radially extending ridges have the effect of providing further mixing of the ionized gas or liquid and the liquid to be treated. As noted, these ridges are preferably formed of a ferromagnetic material such as a magnetic stainless steel, so that the magnetic field can further cause coagulation of the coagulant materials and the contaminants to be removed from the process stream to be treated.

It will be appreciated by those of skill in the art that the combination of (i) introduction of the ionized coagulant into the stream of fluid to be treated at a point of high pressure, followed by an immediate reduction in pressure; (ii) the continued swirling, countercurrent, turbulent mixing of the stream provided by the spiral path of the combined streams upwardly through vessel 10; (iii) the countercurrent change of flow direction when the streams flow over the open upper edge of fluid exit tube 36 and then downwardly through fluid exit tube 36; (iv) turbulence introduced by baffle 18; and (v) turbulence due to the radially extending ridges on one or more of the inner surfaces of intermediate vertically extending tubular section 32 and the inner and outer surfaces of fluid exit tube 36, provides very thorough physical mixing of the ionized coagulant, magnetite particles, if employed, and the contaminants to be removed from the water stream to be treated. More particularly, since these materials tend to be attracted to one another, but may be present in relatively low concentrations, a thorough mixing as provided by vessel 10 according to the invention is highly desirable in order to encourage successful coagulation and flocculation of these materials so that they can be subsequently removed in essentially conventional filtration steps, or by combination of conventional and novel filtration steps, as discussed above in connection with FIG. 1.

According to a further aspect of the invention, and as discussed briefly above, coil 38 is disposed about at least the intermediate tubular section of the vessel 10 and is connected to power supply 40. When power supply 40 is energized, a magnetic field H of generally solenoidal configuration extends through at least intermediate tubular portion 32 of vessel 10, including the interior of exit tube 36, and into the upper and lower mixing vessels 30 and 34, as depicted schematically in FIG. 2. In order that the magnetic field H can be efficiently employed, it is desirable that the materials of vessel 10 be ferromagnetic, e.g., mild steel as noted above.

It will be appreciated by those of skill in the art that most of the contaminants sought to be removed by the apparatus and system of the invention, these including oil and grease emulsions, heavy metals, materials exhibiting biological oxygen demand such as organic solubles and particulates, materials exhibiting chemical oxygen demand, colloidal solid particulates, agricultural organic contaminants, and other inorganic/organic contaminants, including contaminants described as total organic carbon (TOC) and total inorganic carbon (TIC) as these terms are conventionally used in the art, largely comprise polar or ionic molecules responsive to a magnetic field. Similarly, the ionized coagulants are, of course, also responsive to a magnetic field, and, indeed, water molecules themselves are magnetically polar. Accordingly, when a solenoidal magnetic field H is applied as indicated by FIG. 2, these polar materials tend to become polarized, i.e., aligned with one another, and are brought into still more intimate physical contact. This further encourages coagulation and flocculation and thereby increases the efficiency of removal of the contaminants from the process stream to be treated.

As indicated generally above, dc power is preferably employed to excite coil 38 to emit magnetic field H. Preferably the polarity of the dc power is reversed at controllable time intervals on the order of seconds to minutes. Reversal of the polarity of the power supply reverses the direction of the magnetic field H and tends to remove any polar molecules or the like that may have collected, for example, in the crevices formed by the radially inwardly extending ridges 72, 74, and 76.

In the successfully-tested embodiment of the system discussed above, coil 38 comprised substantially 400 feet of 14 AWG stranded insulated copper wire wrapped in two layers spiraling up and down the intermediate tubular portion 32 of the vessel 10.

In the preferred embodiment, the amount of power applied to coil 38 varies with the rate of flow of the fluid to be treated, and the ionized coagulant is similarly supplied at a rate responsive to the rate of flow of the fluid to be treated. Of course, the rate of supply of the ionized coagulant may also be varied with detected variation in the amount of contaminants present in the process stream to be treated. Similarly, the addition of magnetite particles from source 60 may be controlled responsive to the characteristics of the stream to be treated. In a particularly preferred embodiment a controller 80 (FIG. 1) such as a microprocessor, computer or the like, in combination with associated flow sensors, contaminant monitoring instrumentation, solenoid valves, and similarly well-known process control equipment may be provided to automatically control these and other system parameters, such as the periodic reversal of the polarity of the dc power applied to coil 38.

The following Table provides typical values of the dc voltage supplied to and the current drawn by coil 38 with respect to the rate of flow of the fluid to be treated from source 12, and also illustrates typical corresponding rates of injection of a typical gaseous ionized coagulant such as ionized oxygen, together with typical values for the magnetic field strength H.

TABLE

| Process Stream Flow Rate (GPM) | Ionized Gas Coagulant Injection Rate (CFM) | Voltage (Vdc) | Current (A) | H (Gauss) |
| --- | --- | --- | --- | --- |
| 25 | 1.0 | 6 | 8 | 100,000 |
| 30 | 2.0 | 12 | 14 | 170,000 |
| 35 | 3.0 | 18 | 21 | 280,000 |
| 40 | 4.0 | 24 | 29 | 400,000 |

Thus, it can be seen from the Table that for a typical flow rate of 30 gallons per minute of water contaminated with typical inorganic and/or organic contaminants, e.g., as found in water streams, or the like, ionized coagulant gas, e.g., ionized oxygen or ozone, may be injected at an injection rate of 2 cubic feet per minute, and dc power at 12 volts applied to a coil 38 as described above, resulting in a current of 14 amperes being drawn and a magnetic field of 170,000 Gauss imposed. It will be appreciated, of course, that these figures (as well as other specifics mentioned herein) are exemplary only and by no means limit the invention.

While a number of details of the preferred embodiment of the invention have been discussed in detail, it will be appreciated that these are exemplary only and that the invention is susceptible of many modifications and improvements, including those within the state of the art at the time of filing of the application and others that may be subsequently invented. Therefore, the invention should not be limited by the above disclosure, but only by the following claims.

What is claimed is:

1. An apparatus for turbulent mixing and magnetic entrainment of a stream of an ionized liquid or gas within a stream of a liquid to be treated, comprising:

a junction tube for receiving a stream of said liquid to be treated and a stream of said ionized liquid or gas, and for mixing said streams and conveying the mixed streams to an inlet of a vertically elongated vessel, said vertically elongated vessel comprising a first lower mixing chamber, an intermediate elongated tubular portion extending vertically, and a second upper mixing chamber, and a fluid tube extending vertically through the center of said vertically elongated vessel, said first lower and said second upper mixing chambers each defining an interior space having a major diameter and a port of lesser diameter in communication with said intermediate elongated tubular portion, said first lower mixing chamber having an inlet in communication with said junction tube for receiving said streams of said liquid to be treated and of said ionized liquid or gas, said inlet defining a horizontal inlet axis spaced from a vertical centerline of said lower mixing chamber, so as to define a liquid flow stream extending tangentially around said lower mixing chamber, so that liquid flowing along said liquid flow stream flows in a generally spiral pattern around said lower mixing chamber, upwardly through said intermediate elongated tubular portion, around said fluid exit tube, and into said upper mixing chamber, said fluid exit tube having an open upper end disposed in said upper mixing chamber for receiving liquid from said upper mixing chamber and extending downwardly through said intermediate elongated tubular portion and said lower mixing vessel to a lower discharge end, and means for applying an electromagnetic field to fluid flowing at least in said intermediate elongated tubular portion of said vertically elongated vessel.

2. The apparatus of claim 1, wherein said means for applying an electromagnetic field to fluid flowing at least in said intermediate elongated tubular portion of said vertically elongated vessel comprises a coil wrapped around said intermediate elongated tubular portion of said vertically elongated vessel, and a power supply for applying electrical energy thereto.

3. The apparatus of claim 2, wherein said power supply provides dc power to said coil.

4. The apparatus of claim 3, wherein the polarity of said dc power is reversed at intervals.

5. The apparatus of claim 4, wherein the polarity of said dc power is reversed at controllable intervals on the order of seconds to minutes.

6. The apparatus of claim 1, further comprising controller means for controlling the rate of addition of said ionized liquid or gas and the intensity of said electromagnetic field with respect to the quantity of said liquid to be treated.

7. The apparatus of claim 1, wherein the material of at least said intermediate elongated tubular portion of said vertically elongated vessel is ferromagnetic.

8. The apparatus of claim 1, wherein said lower discharge end of said fluid exit tube is disposed beneath said lower mixing vessel.

9. The apparatus of claim 1, in combination with means for supply of a stream of ionized fluid or gas for mixing with said stream of fluid to be treated.

10. The apparatus of claim 1, in combination with means for supply of a stream of magnetite coagulant material mixed with said stream of fluid to be treated.

11. The apparatus of claim 1, wherein said junction tube comprises a venturi for increasing the velocity of flow of said mixed streams of said liquid to be treated and of said ionized liquid or gas entering said lower mixing vessel.

12. The apparatus of claim 1, wherein one or more of facing surfaces of said intermediate elongated tubular portion of said vessel and of said fluid exit tube, and the inner surface of said fluid exit tube, define a substantially continuous plurality of ridges extending inwardly therefrom.

13. A system for removal of dissolved materials, colloidal particulates, organic and inorganic molecules, and other contaminants from a liquid stream to be treated, comprising:

a source of an ionized treatment liquid or gas, a junction tube for receiving a stream of said liquid to be treated and a stream of said ionized treatment liquid or gas, and for mixing said streams and conveying the mixed streams to an inlet of a vertically elongated vessel, said vertically elongated vessel comprising a first lower mixing chamber, an intermediate elongated tubular portion, a second upper mixing chamber, and a fluid exit tube extending vertically through said vertically elongated vessel, and having an open upper end disposed in said upper mixing chamber for receiving liquid from said upper mixing chamber, and extending downwardly through said intermediate elongated tubular portion of lower mixing vessel to a lower discharge end, said lower mixing chamber having an outlet port, of smaller diameter than the largest inside diameter of said lower mixing chamber, in communication with an open lower end of said intermediate elongated tubular portion, said upper mixing chamber having an inlet port in communication with an open upper end of said elongated tubular portion, said first lower mixing chamber having an inlet in communication with said junction tube for receiving said streams of said liquid to be treated and of said ionized treatment liquid or gas, said inlet being substantially horizontal and located off the axis of said lower mixing chamber, so as to define a liquid flow stream extending tangentially around said lower mixing chamber, said intermediate elongated tubular portion having a lower opening in fluid communication with an upper opening in said lower mixing chamber so that liquid flowing along said liquid flow stream flows in a generally spiral flow path around said lower mixing chamber, upwardly through said intermediate elongated tubular portion, and around said fluid exit tube, before entering said upper mixing chamber, a power supply for providing electric power, means connected to said power supply for applying an electromagnetic field to fluid flowing at least in said intermediate elongated tubular portion of said vertically elongated vessel, and filtration media for removing said dissolved materials, colloidal particulates, organic and inorganic molecules, and other constituents, having been agglomerated by exposure to said ionized treatment liquid or gas while exposed to said electromagnetic field, from said stream of liquid to be treated.

14. The system of claim 13, further comprising controller means for controlling the rate of addition of said ionized liquid or gas and the intensity of said electromagnetic field with respect to the quantity of said liquid to be treated.

15. The system of claim 13, wherein said means for applying an electromagnetic field to fluid flowing at least in said intermediate elongated tubular portion of said vertically elongated vessel comprises a coil wrapped around said intermediate elongated tubular portion of said vertically elongated vessel.

16. The system of claim 15, wherein said power supply provides dc power to said coil.

17. The apparatus of claim 16, wherein the polarity of said dc power is reversed at intervals.

18. The apparatus of claim 17, wherein the polarity of said dc power is reversed at controllable intervals on the order of seconds to minutes.

19. The system of claim 13, further comprising means for supply of a stream of magnetite coagulant material, and means for mixing such stream of magnetic coagulant material with said stream of fluid to be treated.

20. The system of claim 13, wherein said junction tube comprises a venturi for increasing the velocity of flow of said mixed streams of said liquid to be treated and of said ionized liquid or gas entering said lower mixing vessel.

21. The system of claim 13, wherein one or more of the inner surface of said intermediate elongated tubular portion of said vessel and the surfaces of said fluid exit tube are formed to define a substantially continuous plurality of ridges extending inwardly therefrom.

22. A vertically elongated vessel for turbulent mixing of a stream of fluid to be treated with one or more streams of ionized fluid or gas to be mixed with said stream of fluid to be treated, comprising a first lower mixing chamber, a vertical intermediate elongated tubular portion, a second upper mixing chamber, and a fluid exit tube extending centrally through said lower mixing chamber, said intermediate elongated tubular portion, and said upper mixing chamber, said first mixing chamber having a fluid communication port for passing said streams of said liquid to be treated and of said ionized liquid or gas, said fluid communication port being substantially horizontal and located off the axis of said first mixing chamber, so as to define a liquid flow stream extending tangentially around said first mixing chamber, said intermediate elongated tubular portion having a first opening in fluid communication with a mating opening in said first mixing chamber, whereby liquid flowing along said liquid flow stream flows in a generally spiral pattern through said intermediate elongated tubular portion, upwardly around said fluid exit tube, such that said generally spiral flow pattern of said mixed streams continues along and around said fluid exit tube, and said intermediate elongated tubular portion having an second opening in fluid communication with a mating opening in said second mixing chamber, said fluid tube having an open end disposed in said second mixing chamber and extending through said intermediate elongated tubular portion and said first mixing vessel to a fluid connection, and means for applying an electromagnetic field to fluid flowing at least in said intermediate elongated tubular portion of said vertically elongated vessel.

23. The apparatus of claim 22, wherein one or more of the inner surface of said intermediate elongated tubular portion of said vessel and the surfaces of said fluid exit tube are formed to define a substantially continuous plurality of ridges extending inwardly therefrom.

* * * * *